United States Patent
Yoon et al.

(10) Patent No.: US 10,185,079 B2
(45) Date of Patent: Jan. 22, 2019

(54) DISPLAY APPARATUS

(71) Applicant: SAMSUNG ELECTRONICS CO., LTD., Suwon-si (KR)

(72) Inventors: Min Gyu Yoon, Suwon-si (KR); Heong Seog Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 36 days.

(21) Appl. No.: 15/014,591

(22) Filed: Feb. 3, 2016

(65) Prior Publication Data

US 2016/0223739 A1 Aug. 4, 2016

(30) Foreign Application Priority Data

Feb. 3, 2015 (KR) ........................ 10-2015-0017003

(51) Int. Cl.
*F21V 8/00* (2006.01)
*G02F 1/1333* (2006.01)
*G02F 1/1335* (2006.01)

(52) U.S. Cl.
CPC ........... *G02B 6/0088* (2013.01); *G02B 6/009* (2013.01); *G02B 6/0031* (2013.01); *G02B 6/0085* (2013.01); *G02F 1/133308* (2013.01); *G02B 6/0068* (2013.01); *G02B 6/0073* (2013.01); *G02F 1/133615* (2013.01); *G02F 2001/13332* (2013.01); *G02F 2001/133314* (2013.01); *G02F 2001/133317* (2013.01); *G02F 2001/133614* (2013.01)

(58) Field of Classification Search
None
See application file for complete search history.

(56) References Cited

U.S. PATENT DOCUMENTS

| 2006/0050195 A1 | 3/2006 | Choi et al. |
| 2007/0085943 A1* | 4/2007 | Kang .................. G02B 6/0031 349/65 |

(Continued)

FOREIGN PATENT DOCUMENTS

| CN | 102889523 A | 1/2013 |
| CN | 103698937 A | 4/2014 |

(Continued)

OTHER PUBLICATIONS

Search Report dated Jun. 1, 2016, issued by the International Searching Authority in counterpart International Patent Application No. PCT/KR2016/000932 (PCT/ISA/210).

(Continued)

*Primary Examiner* — Edward Glick
*Assistant Examiner* — Anthony G Quash
(74) *Attorney, Agent, or Firm* — Sughrue Mion, PLLC

(57) ABSTRACT

Disclosed herein is a display apparatus having a quantum dot sheet to change color by converting the wavelength of blue lights, a middle mold having a middle supporting unit to support a front edge unit of a light guide plate, and a supplement member coupled to the middle supporting unit and configured to reflect the light radiated from the a source to prevent the light that is radiated from the light source from exiting through the gap between the light guide plate and the middle supporting unit, and thus the generation of bright line may be minimized and heat radiation performance may be enhanced.

18 Claims, 10 Drawing Sheets

(56) References Cited

U.S. PATENT DOCUMENTS

| | | | |
|---|---|---|---|
| 2008/0198627 A1 | 8/2008 | Matsumoto | |
| 2010/0007817 A1* | 1/2010 | Kim | G02B 6/0083 349/60 |
| 2013/0271700 A1* | 10/2013 | Nakamura | G02B 6/0026 349/65 |
| 2013/0294107 A1 | 11/2013 | Ohkawa et al. | |
| 2014/0119049 A1 | 5/2014 | Kim et al. | |
| 2014/0301107 A1* | 10/2014 | Mizutani | G02B 6/0091 362/612 |
| 2015/0331170 A1* | 11/2015 | Cheng | G02B 6/0031 362/607 |
| 2015/0355399 A1* | 12/2015 | You | G02B 6/005 349/65 |
| 2015/0355400 A1* | 12/2015 | Li | G02F 1/133608 349/62 |
| 2016/0033711 A1* | 2/2016 | Lee | G02F 1/133615 362/607 |

FOREIGN PATENT DOCUMENTS

| | | | | |
|---|---|---|---|---|
| CN | 203587926 U | 5/2014 | | |
| EP | 2700998 A1 | 2/2014 | | |
| EP | 2719943 A1 | 4/2014 | | |
| EP | 2980639 A1 | 2/2016 | | |
| JP | 2013-218953 A | 10/2013 | | |
| JP | 2013-218954 A | 10/2013 | | |
| KR | 10-2006-0084558 A | 7/2006 | | |
| KR | 20070066638 A | * | 6/2007 | G02F 1/1333 |
| KR | 10-2008-0001981 A | 1/2008 | | |
| KR | 10-2009-0060707 A | 6/2009 | | |
| KR | 10-2009-0117005 A | 11/2009 | | |
| KR | 10-2011-0007332 A | 1/2011 | | |
| KR | 10-2013-0057092 A | 5/2013 | | |
| WO | 2013/077568 A1 | 5/2013 | | |

OTHER PUBLICATIONS

Communication dated Jun. 16, 2016, issued by the European Patent Office in counterpart European Patent Application No. 16153152.0.
Communication dated Feb. 28, 2018, issued by the European Patent Office in counterpart European application No. 16 153 152.0.
Communication dated Jun. 16, 2017 by the European Patent Office in counterpart European Patent Application No. 16153152.0.
Communication dated May 24, 2018 issued by the Russian Patent Office in counterpart Russian Application No. 2017126728.

* cited by examiner

DISPLAY APPARATUS

CROSS-REFERENCE TO RELATED APPLICATION

This application claims the benefit of the Korean Patent Application No. 2015-0017003, filed on Feb. 3, 2015, in the Korean Intellectual Property Office, the disclosure of which is incorporated herein by reference.

BACKGROUND

1. Field

Embodiments of the present disclosure relate to a display apparatus, and more particularly, to a display apparatus provided with enhanced color reproducibility.

2. Description of the Related Art

A display apparatus is a type of an output apparatus configured to visually display data and images, such as texts and figures. A display apparatus may include televisions, various monitors, and various mobile terminals, such as notebooks, tablet PCs, and smart phones.

The display apparatus may be classified into a light emitting type display apparatus using a display panel, such as an OLED (Organic Light Emitting Diode) panel configured to self-radiate light, and a light receiving type display apparatus using a display panel, such as a LCD (Liquid Crystal Display) configured to be supplied with light from a backlight unit.

The backlight unit may be implemented with a light source such as a CCFL (Cold Cathode Fluorescent Lamp), an EEFL (External Electrode Fluorescent Lamp), or a LED (Light Emitting Diode), and various subsidiary optical members.

The backlight unit, according to the position of the light source, may be classified into a direct type having the light source disposed at a rear of the display unit, and an edge type having the light source disposed at a side of the display panel.

The subsidiary optical members include various optical sheets including a LGP (Light Guide Plate) configured to convert the light radiated from the light source into a surface light source by receiving the light radiated from the light source that is inputted through a side, and a diffusion sheet configured to convert the light radiated from the light source into a surface light source after receiving the light radiated from the light source that is inputted from a rear.

SUMMARY

Therefore, it is an aspect of an exemplary embodiment to provide a display apparatus having enhanced color reproducibility It is another aspect of an exemplary embodiment to provide a display apparatus, with respect to employing an edge type backlight unit, configured to prevent or minimize the occurrence of a bright line due to a light leakage.

It is still another aspect of an exemplary embodiment to provide a display apparatus manufactured while having a thin thickness thereof as the occurrence of a bright line is prevented or minimized.

It is still another aspect of an exemplary embodiment to provide a display apparatus having an enhanced heat radiation.

It is still another aspect of an exemplary embodiment to provide a display apparatus manufactured while having a thin thickness thereof as the heat being absorbed at black injected material employed at the edge type backlight unit is minimized.

Additional aspects of an exemplary embodiment will be set forth in part in the description which follows and, in part, will be obvious from the description, or may be learned by practice of the disclosure.

In accordance with one aspect of an exemplary embodiment, a display apparatus is disclosed. The display apparatus includes a top chassis; a bottom chassis; a liquid crystal panel configured to display images; a light source configured to generate light while disposed at a side of the liquid crystal panel; a light guide plate configured to guide the light radiated from the light source to the liquid crystal panel; a quantum dot sheet disposed at a front of the light guide plate; at least one optical sheet disposed at a front of the quantum dot sheet; a middle mold provided between the top chassis and the bottom chassis, and having an outer frame unit and a middle supporting unit configured to support a front edge unit of the light guide plate while extended toward an inner side from the outer frame unit; and a supplement member coupled to the middle supporting unit and configured to reflect the light radiated from the light source.

The supplement member may be formed by elastic material.

The supplement member is closely attached to a edge of the light guide plate, and may be elastically deformed by the pressure of the light guide plate.

The supplement member may be formed by one of materials including polyurethane foam, silicon, rubber, and sponge.

The supplement member may include yellowing prevention material configured to delay a phenomenon of yellowing caused by ultraviolet light.

The supplement member may contact the light guide plate through a protective coating layer.

The protective coating layer may be formed urethane material.

The display apparatus may include an adhesive member configured to couple the supplement member to the middle supporting unit.

The display apparatus may further include a fluorescent member provided between an opening of the middle supporting unit and the supplement member.

The fluorescent member may radiate white light by receiving blue light.

The light source may include at least one blue LED.

A printed circuit board at which the light source is embedded is included, a light radiating surface of the light source may be vertically embedded at an embedding surface of the printed circuit board, and the embedding surface of the printed circuit board may be vertically disposed at a light incidence surface of the light guide plate.

The quantum dot sheet is disposed between the middle supporting unit and the light guide plate, and the at least one optical sheet may be disposed between the liquid crystal panel and the middle supporting unit.

The light source includes the at least one blue LED, and the at least one blue LED may be disposed at each of opposite sides of the light guide plate or may be disposed at one of the opposite sides of the light guide plate while the both sides are provided to face each other.

A printed circuit board at which the light source is embedded is included, a light radiating surface of the light source may be horizontally embedded at an embedding surface of the printed circuit board, and the embedding surface of the printed circuit board may be horizontally disposed at a light incidence surface of the light guide plate.

The display apparatus may include a heat sink unit having a board contacting unit configured to contact a rear surface of the printed circuit board and a bottom chassis contacting unit configured to contact the bottom chassis such that the heat generated from the light source may be transferred to the bottom chassis.

The quantum dot sheet and the at least one optical sheet may be disposed between the middle supporting unit and the light guide plate.

In accordance with another aspect of an exemplary embodiment, a display apparatus is disclosed. The display apparatus includes a bottom chassis, a liquid crystal panel configured to display images; a light source configured to generate light while disposed at a side of the liquid crystal panel; a light guide plate configured to guide the light radiated from the light source to the liquid crystal panel; a quantum dot sheet disposed at a front of the light guide plate; at least one optical sheet disposed at a front of the quantum dot sheet; a top chassis provided at a front of the bottom chassis, and having a light guide plate supporting unit configured to support a front edge unit of the light guide plate; and a supplement member coupled to the light guide plate supporting unit and configured to reflect the light radiated from the light source.

In accordance with still another aspect of an exemplary embodiment, a display apparatus is disclosed. The display apparatus includes a top chassis; a bottom chassis; a liquid crystal panel configured to display images; a light source configured to generate light while disposed at a side of the liquid crystal panel; a light guide plate configured to guide the light radiated from the light source to the liquid crystal panel; at least one optical sheet disposed at a front of the light guide plate; a middle mold provided between the top chassis and the bottom chassis, and having an outer frame unit and a middle supporting unit configured to support a front edge unit of the light guide plate while extended toward an inner side from the outer frame unit; and a supplement member coupled to the middle supporting unit and configured to reflect the light radiated from the light source.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
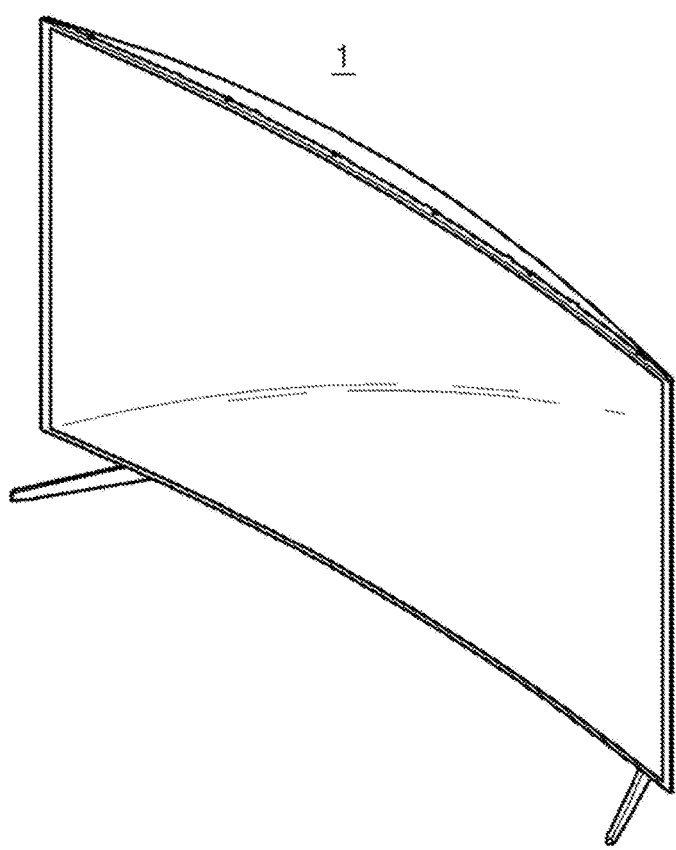
FIG. 1 is a perspective view illustrating a display apparatus according to one exemplary embodiment.

Reference will now be made in detail to the embodiments of the present disclosure, examples of which are illustrated in the accompanying drawings, wherein like reference numerals refer to like elements throughout.

In the present disclosure, a front of a display apparatus 1 is referred to as a direction in which images are displayed, and a rear of the display apparatus 1 is referred to as an opposite direction to the direction in which the images are displayed. For example, a liquid crystal panel 20 is positioned in front of a light guide plate 40, and a top chassis 70 is positioned in front of a bottom chassis 90. On the cross-sectional view of FIG. 4, an upper side of the drawing is referred to as a front of the display apparatus 1, and a lower side of the drawing is referred to as a rear of the display apparatus 1.

In an exemplary embodiment, the terminologies, such as a panel, a sheet, and a plate, are used to describe a flat and thin element. However, these terminologies are used for the convenience of description, not for distinguishing one from another. For example, the terminology "a light guide plate" may be interpreted as or replaced with the terminology, such as "a light guide panel," "a light guide sheet," or "a light guide sheet."

Figure 2:
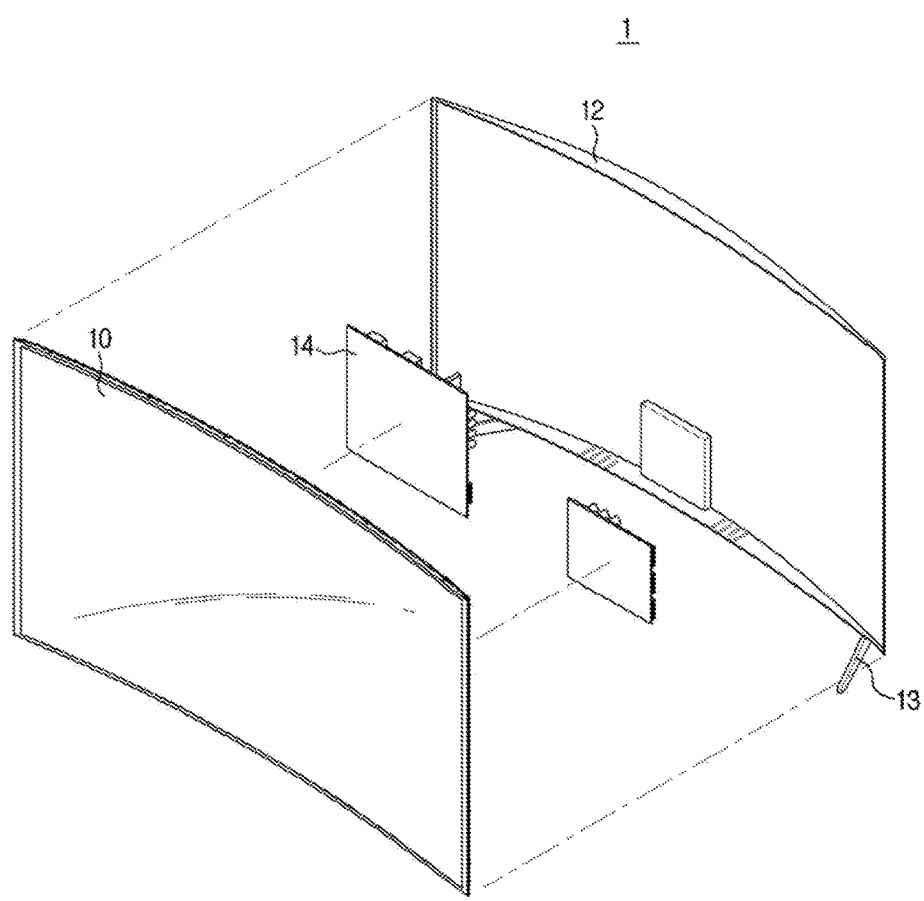
FIG. 2 is an exploded perspective view illustrating the display apparatus according to one exemplary embodiment.

FIG. 1 is a perspective view illustrating a display apparatus according to an exemplary embodiment. FIG. 2 is an exploded perspective view illustrating the display apparatus according to an exemplary embodiment.

Referring to FIG. 1 and FIG. 2, the display apparatus according to an exemplary embodiment is described.

As illustrated on FIG. 1, the display apparatus 1 may have a curved shape. In detail, the display apparatus 1 may have a front portion and a rear portion, and the rear portion has a curved shape (the curvature of the rear portion is greater than that of the front portion). In this way, the rear portion may look like being protruded from the front portion.

As for the display apparatus 1 to be provided with the curved shape, the bottom chassis 90 needs to have a curved surface. The bottom chassis 90 needs to have sufficient strength to maintain the curved shape of the display apparatus 1.

However, the display apparatus 1 may have a flat shape or may be bendable to selectively have a flat shape or a curved shape.

The display apparatus 1 includes televisions and various monitors. Furthermore, the display apparatus 1 includes various mobile terminals, such as notebooks, tablet PCs, and smart phones.

The display apparatus 1 may comprise a display module 10, a main board 14 sending electrical signals to the display module 10, and a housing 12 supporting the display module 10. A lower portion of the housing 12 may be provided with supporting legs 13. The housing 12 may be provided at a rear of the display apparatus 1. However, the housing 12 may be provided at a front of the display apparatus 1, or at both the front and the rear of the display apparatus 1.

Figure 3:
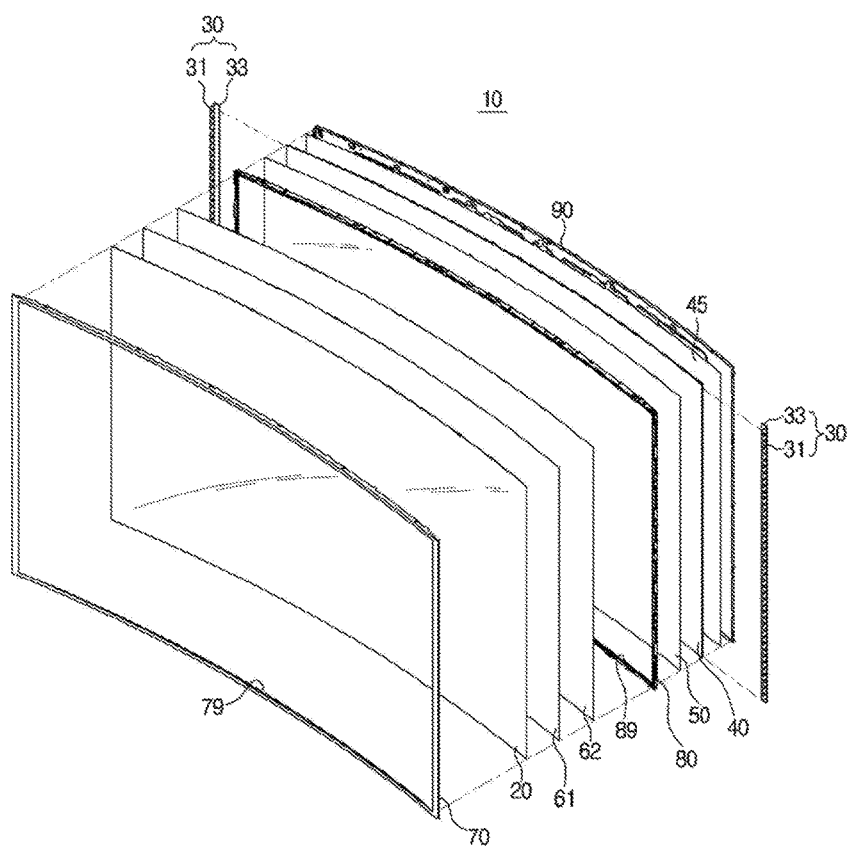
FIG. 3 is an exploded perspective view illustrating a display module according to a first embodiment.
Figure 4:
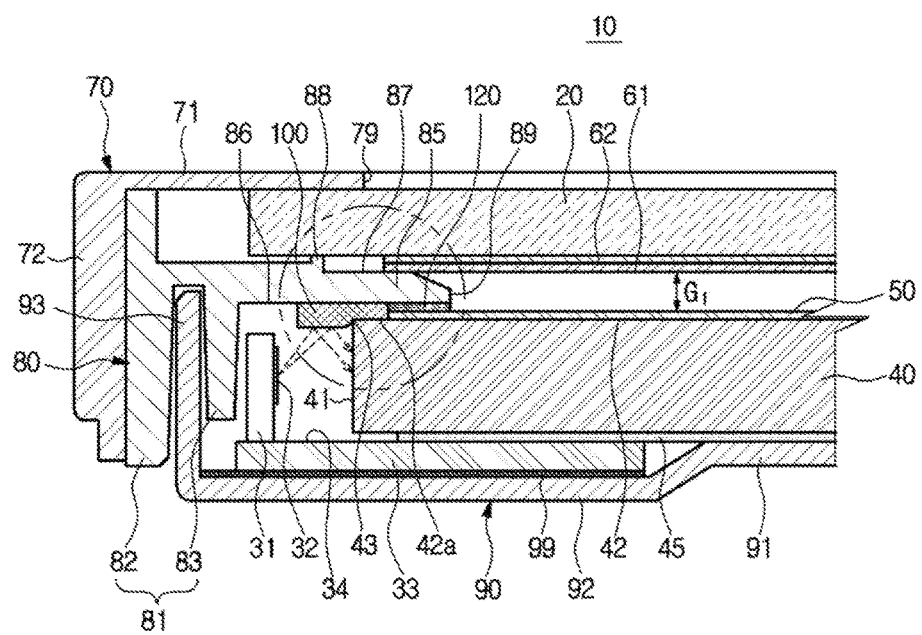
FIG. 4 is a cross-sectional view of the display module according to the first embodiment.
Figure 5:
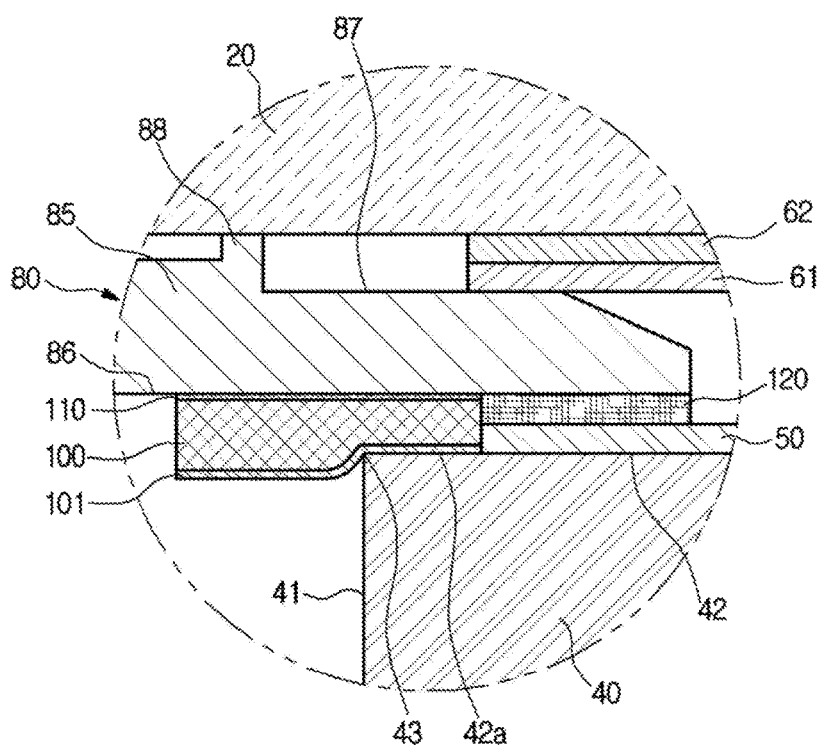
FIG. 5 is a drawing illustrating an enlarged view of a dotted portion of FIG. 4.

FIG. 3 is an exploded perspective view illustrating the display module according to a first embodiment. FIG. 4 is a cross-sectional view of the display module according to the first embodiment. FIG. 5 is a drawing illustrating an enlarged view of a dotted portion of FIG. 4.

Referring to FIG. 3 to FIG. 5, the display module according to the first embodiment will be described.

The display module 10 includes the liquid crystal panel 20 at which images are displayed, a backlight unit for supplying light at the liquid crystal panel 20, and a chassis assembly for supporting the liquid crystal panel 20 and the backlight unit.

The liquid crystal panel 20 may display images in a pixel-base according to the driving voltages applied on the liquid crystals of the liquid crystal panel 20. The liquid crystal panel 20 may be implemented with two sheets of thin boards, where liquid crystals are contained between the two sheets of thin boards, and an electrode provided as to apply the driving voltages on the liquid crystals.

The backlight unit includes a light source module 30, a light guide plate 40, a reflection sheet 45, a quantum dot sheet, and optical sheets 61 and 62. The light source module 30 is used to radiate light. The light guide plate 40 is used to convert the light radiated from the light source module 30 into a surface light source. The reflection sheet 45, disposed in the rear of the light guide plate 40, is used to reflect the light emitted from the light guide plate 40 to an inside of the light guide plate 40. The quantum dot sheet 50, disposed in front of the light guide plate 40, is used to enhance color reproducibility by changing the wavelength of the light. The optical sheets 61 and 62, disposed in front of the quantum dot sheet 50, are used to to enhance optical characteristics, such as brightness, uniformity, and directivity of the light.

The backlight unit may be implemented with an edge-type backlight unit. That is, the light source module 30 may be disposed at a side of the liquid crystal panel 20 such that the light source module 30 emits light into the side of the liquid crystal panel 20.

The light source module 30 may include a light source 31 and a printed circuit board 33 at which the light source 31 is embedded. The light source 30 may be at least one blue LED (Light Emitting Diode). For example, multiple blue LEDs may be disposed in line where each of the blue LEDs has a set distance from each other.

The light source 31 may be provided with a light radiating surface 32 vertically positioned on an embedding surface 34 of the printed circuit board 33. The embedding surface 34 of the printed circuit board 33 may be parallelly disposed at a rear of an edge of the light guide plate 40 with respect to an incidence light emitting surface 42 of the light guide plate 40.

Figure 7:
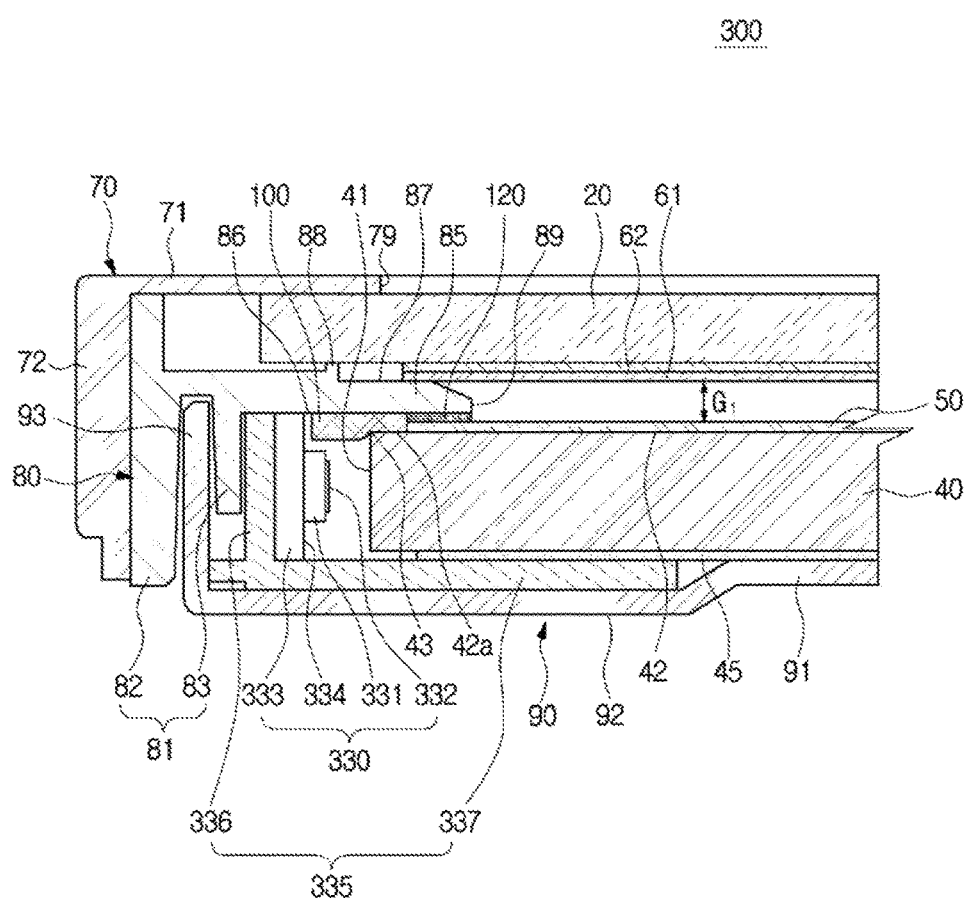
FIG. 7 is a cross-sectional view of the display module according to a third embodiment.

However, a light source 331 may be provided with a light radiating surface 332 horizontally embedded with respect to an embedding surface 334 of a printed circuit board 333 (FIG. 7). In addition, the embedding surface 334 of the printed circuit board 333 may be parallelly disposed at a light incidence surface 41 of the light guide plate 40 (FIG. 7).

The light guide plate 40 may be disposed and spaced apart by a predetermined distance with respect to the light source 31. The light guide plate 40 may be provided with the approximate shape of a thin cuboid. The light guide plate 40 may be provided with a pair of long sides, a pair of short sides, and a predetermined thickness.

The light guide plate 40 may be provided with the light incidence surface 41 and the incidence light emitting surface 42. In the present embodiment, the light incidence surface 41 of the light guide plate 40 is referred to as a side surface of the light guide plate 40, and the incidence light emitting surface 42 of the light guide plate 40 is referred to a front surface of the light guide plate 40.

The light guide plate 40 guides light to the liquid crystal panel 20 by receiving the light from the light incidence surface 41 and emitting the light to a front (the incidence light emitting surface 42). That is, the light guide plate 40 may similarly convert the light source disposed at a side of the light guide plate 40 into a surface light source.

The light guide plate 40 may be provided with various patterns configured to evenly emit the light inputted to the inside of the light guide plate 40 toward a front of the light guide plate 40. The light guide plate 40 may be formed by use of acryl resin.

The reflection sheet 45 is provided at a rear of the light guide plate 40, and is configured to reflect the light emitted from an inside of the light guide plate 40 to a rear of the light guide plate 40 back to the inside of the light guide plate 40. The reflection sheet 45 may be integrally formed with the light guide plate 40.

The quantum dot sheet 50 is provided to enhance the color reproducibility by changing the wavelength of light. The color reproducibility is provided as a measurement of closeness to natural color, and how much area in the color coordinate (color space) may be represented.

The quantum dot sheet 50 is provided with quantum dots, which are light-emitting semiconductor substances each having a size of several nanometers, dispersedly disposed at an inside thereof. The quantum dot according to the size thereof may generate all the colors of visible ray while receiving blue light. The light having shorter wavelength is generated if the size of the quantum dot is small, and the light having longer wavelength is generated if the size of the quantum dot is large.

The quantum dot sheet 50 is provided with the first optical sheet 61 and the second optical sheet 62 disposed at a front thereof. The first optical sheet 61 may be a diffusion sheet 61 to diffuse light. The second optical sheet 61 may be a composite sheet having a prism function and a polarizing function. As one example, the second optical sheet 62 may be a DBEF (Dual Brightness Enhancement Film) sheet, which is a high brightness prism sheet.

However, one optical sheet or more than three optical sheets may also be provided.

In addition, the quantum dot sheet 50 may be considered a type of an optical sheet as well. However, in the present disclosure, by considering the distinguished and particular effects of the quantum dot sheet 50, the quantum dot sheet 50 is illustrated as a specific sheet, distinguished over other optical sheets.

The chassis assembly is provided to protect and support the liquid crystal panel 20 and the backlight unit. The chassis assembly may be structured with the top chassis 70, a middle mold 80, and the bottom chassis 90.

The top chassis 70 may be structured with an opening 79 through which the liquid crystal panel 20 is exposed, a bezel unit 71 to support a front edge unit of the liquid crystal panel 20 and form a bezel, and a top side surface unit 72 extended from the bezel unit 71 to a rear of the liquid crystal module 10.

The bottom chassis 90 is provided to form a rear surface of the display module 10. The bottom chassis 90 may be structured with a base unit 91, a board accommodation unit 92, and a bottom side surface unit 93. The board accommodation unit 92 is protruded from the base unit 91 to a rear as to accommodate the printed circuit board 33 of the light source module 30.

A heat radiation sheet 99 may be provided between the bottom chassis 90 and the printed circuit board 33 as to efficiently transfer the heat generated from the light source 31 to the bottom chassis 90.

The heat radiation sheet 99 is disposed at a lower end of the printed circuit board 33 at a border of the bottom chassis

90, may be formed by use of graphite material, and may be implemented by use of a heat pipe.

The heat radiation sheet 99 and the printed circuit board may be directly contacted, while the printed circuit board 33 may indirectly or partially contacts the bottom chassis through a separate bracket configured to fix a border portion of the bottom chassis or through a separate heat transferring member.

The bottom chassis 90 may be formed by aluminum material having high heat conductivity. However, the bottom chassis 90 may be formed by SUS (Stainless Steel) material. The SUS may be cheaper than the aluminum and have acceptable heat conductivity. In detail, the bottom chassis 90 may be formed by SECC (Stainless steel Electrogalvanized Cold-Rolled Steel) material.

The base unit 91 and the board accommodation unit 92 may be formed to provide a step to evenly support the light guide plate 40 and the reflection sheet 45. The step provided by the combination of the base unit 91 and the board accommodation unit 92 may be as deep as the thickness of the printed circuit board 33 and the heat radiation sheet 99.

The middle mold 80 may be structured with an opening 89 through which the light is transmitted from the light guide plate 40 to the liquid crystal panel 20, an outer frame unit 81, and a middle supporting unit 85 protruded toward an inner side from the outer frame unit 81. The middle mold 80 may be formed by use resin material through an injection molding.

The outer frame unit 81 may be provided with an outer side coupling unit 82 for coupling with respect to the bottom chassis 90, and an inner side coupling unit 83. The middle mold 80 and the bottom chassis 90 may be coupled with each other as the bottom side surface unit 93 of the bottom chassis 90 is inserted into an space between the outer side coupling unit 82 and the inner side coupling unit 83. However, the aforementioned insertion-coupling structure is provided as one example, and the middle mold 80 and the bottom chassis 90 may be coupled with each other by use of various coupling methods.

The middle supporting unit 85 may define the opening 89, and in the present disclosure, the middle supporting unit 85 may be extended to be inserted into the placed between of the quantum dot sheet 50 and the optical sheet 61.

Therefore, the quantum dot sheet 50 may be positioned between the middle supporting unit 85 and the light guide plate 40, and the optical sheets 61 and 62 may be positioned between the liquid crystal panel 20 and the middle supporting unit 85.

Through the above, a predetermined gap G1 may be formed between the quantum dot sheet 50 and the optical sheet 61, and as the light passed through the quantum dot sheet 50 is inputted to the optical sheet 61 after proceeding as much as by the predetermined gap G1, the optical characteristics of the light such as brightness, uniformity, and directivity may be enhanced or maintained, and the light is inputted to a rear of the liquid crystal panel 20.

Figure 8:
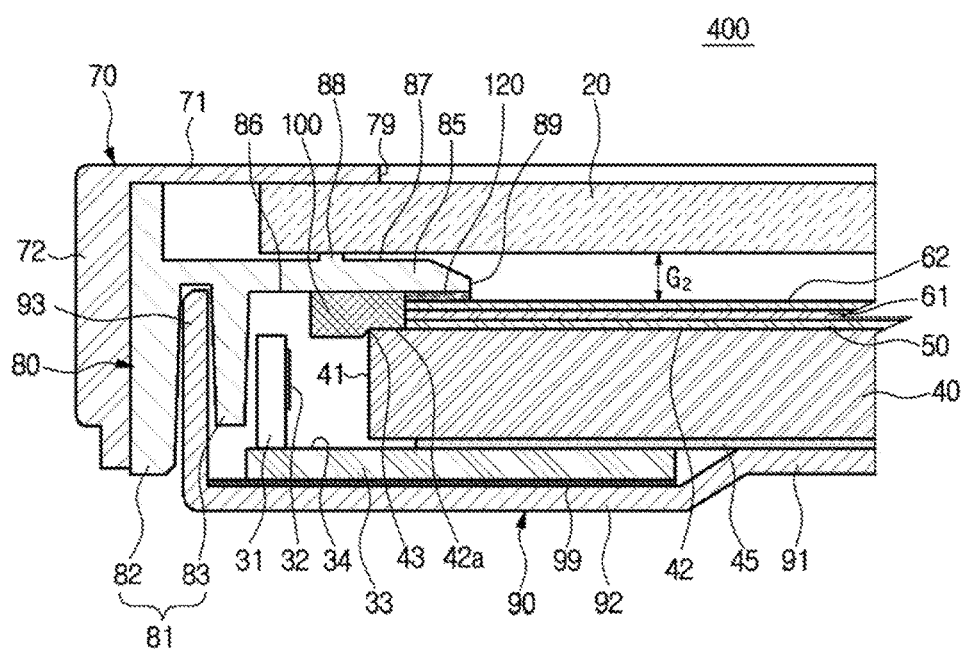
FIG. 8 is a cross-sectional view of the display module according to a fourth embodiment.

However, all of the optical sheets and the liquid crystal panel may be sequentially disposed while reciprocally making contacts with respect to each other as to minimize the loss of the light emitted from the light source 30 (FIG. 9), or the optical sheets may be disposed as to contact with each other while the liquid crystal panel may be disposed as to be spaced apart from the optical sheets (FIG. 8).

The middle supporting unit 85 may include a panel supporting unit 88 for supporting an edge of a rear surface of the liquid crystal panel 20, a sheet supporting unit 87 for supporting an edge of a rear surface of the optical sheet 61, and a light guide plate supporting unit 86 for supporting an edge 42a of a front surface 42 of the light guide plate 40.

The light guide plate supporting unit 86 of the middle supporting unit 85 may be formed to have a plane surface to closely attach to the edge 42a of a front surface 42 of the light guide plate 40.

Preferably, the light guide plate supporting unit 86 may closely attach more than three of the total of four edges of the front surface 42 of the light guide plate 40.

However, due to a tolerance of parts, an assembly error, or a deformation of the light guide plate 40, a gap may exist between the light guide plate supporting unit 86 of the middle supporting unit 85 and the edge 42a of the front surface 42 of the light guide plate 40. Accordingly a light leakage phenomenon may occur due to the gap. This phenomenon occurs because the light radiated from the light source 31 is directly proceeded though the gap toward the liquid crystal panel 20 from a border of the quantum dot sheet 50 without passing through the quantum dot sheet 50, and a bright line may be generated at a side of the liquid crystal panel 20.

Particularly, the display apparatus 1 of an exemplary embodiment may be provided with the clearer bright line occurred thereto if the display apparatus 1 uses a blue LED as the light source 31 and the quantum dot sheet 50 having yellow color.

Therefore, the display apparatus 1 includes a supplement member 100 to prevent or minimize the light radiated from the light source 31 from exiting through the gap between the light guide plate 40 and the middle supporting unit 85.

The supplement member 100 may have a white color such that the heat generated from the light source 31 may be prevented or minimized from being transferred to the liquid crystal panel 20 because the heat is absorbed through the supplement member 100 and then transferred to the middle mold 80, which is injection-molded mainly by use of black-colored material.

The supplement member 100 is coupled to the light guide plate supporting unit 86 of the middle supporting unit 85. The supplement member 100 is formed by high density polyurethane foam material having the functions including absorption of impact, obscuration effect, protection against outside pressure, prevention and/or minimization of vibration, protection against dust, air tightness, and gap calibration, and is disposed in the shape of a strip wrapping around the light guide plate as to be elastically deformed because of the pressure from the middle supporting unit 85 and the light guide plate 40.

However, the supplement member 100 is provided to be closely and reciprocally attached such that the middle supporting unit 85 and the light guide plate 40 are pushed in an outside direction while the supplement member 100 is provided to be wrapping around an edge 43 of the light guide plate 40. Through the above, the leaking of light through the space between of the light guide plate 40 and the middle supporting unit 85 may be prevented or minimized.

The supplement member 100 may be formed by silicon, rubber compound, or chemical material having the functions including absorption of impact, obscuration effect, protection against outside pressure, prevention and/or minimization of vibration, protection against dust, air tightness, and gap calibration while provided with elastic characteristic.

The supplement member 100 may include yellowing prevention material to prevent or delay a phenomenon of yellowing caused by a continuous exposure to the light (especially ultraviolet light) generated from the light source 31. The yellowing prevention material may be added to the supplement member 100, or may be coated at the surface of the supplement member 100.

The supplement member 100 may include a protective coating layer 101 to stop or prevent a wearing phenomenon caused by friction with the light guide plate 40 that occurs as a result of moving the display apparatus. The protective coating payer 101 may be formed by urethane material. The protective coating layer 101 may be formed only at a portion at which the friction occurs with respect to the light guide plate 40, or may be formed on the entire supplement member 100.

The supplement member 100 may be attached to the middle supporting unit 85 of the middle mold 80 by using a separate adhesive member 110. The adhesive member 110 includes a double-sided tape.

A fluorescent member 120 may be provided at the middle supporting unit 85 of an inner side of the supplement member 100. That is, the fluorescent member 120 may be provided between the middle supporting unit 85 and the opening 89. The fluorescent member 120, although the supplement member 100 is closely attached to the light guide plate 40, is provided as to convert the color of the light exiting through the space between the light guide plate 40 and the middle supporting unit 85 from blue to white.

That is, the fluorescent member 120 is provided to generate the white-colored light by receiving the blue-colored light of the blue LED. Through the above, the bright line phenomenon may be reduced.

The fluorescent member 120 may be a sheet or may be applied on the middle supporting unit 85 in the form of paint.

Figure 6:
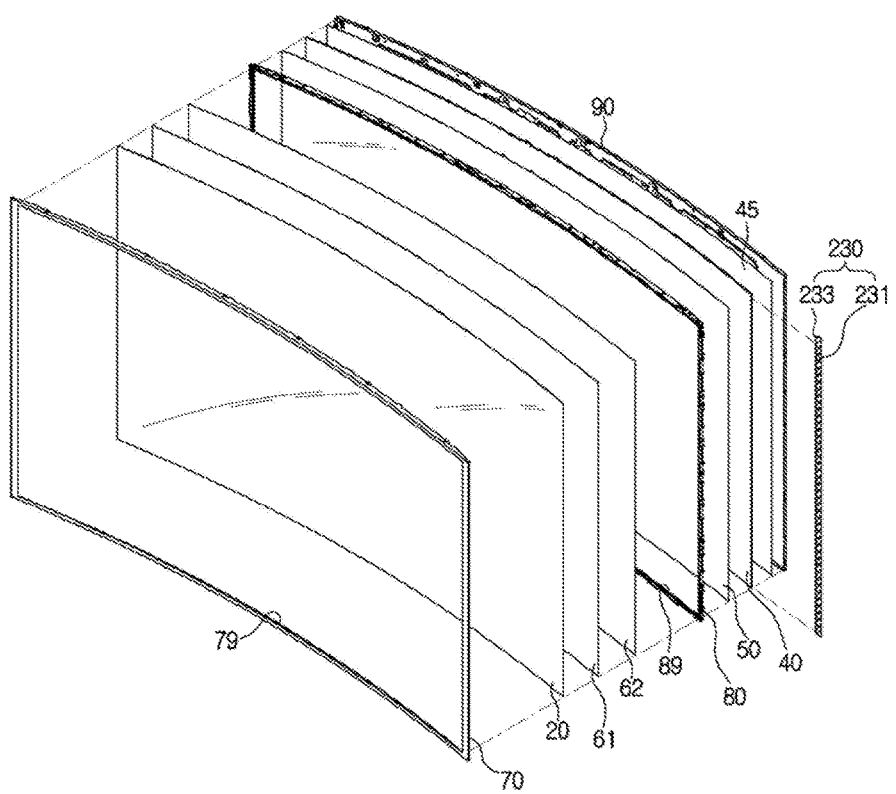
FIG. 6 is an exploded perspective view illustrating the display module according to a second embodiment.

FIG. 6 is an exploded perspective view illustrating a display module according to a second embodiment.

Referring to FIG. 6, a display module 200 according to the second embodiment will be described. With respect to the components that are identical to those of the first embodiment, the descriptions may be omitted.

The display module 200 is provided with an edge type backlight unit. However, in contrast to the first embodiment, a light source module 230 may be provided at only one side, instead of both sides, of the liquid crystal panel 20 or the light guide plate 40.

That is, the light guide plate 40 may have long sides and short sides, and the light source module may be installed at both short sides or at one short side of the light guide plate 40, or may be installed at upper and lower of the long side or at one of the upper and lower long sides.

The light source module 230 includes at least one blue LED 231, and the blue LEDs 231 may be provided to be arranged in line at one side of the liquid crystal panel 20 where each of the blue LEDs 231 has a set distance from each other.

FIG. 7 is a cross-sectional view of the display module according to a third embodiment.

Referring to FIG. 7, a display module 300 according to the second embodiment will be described. With respect to the components that are identical to those of the first embodiments, the descriptions may be omitted.

A light source module 330 may include a light source 331 and the printed circuit board 333 at which the light source 331 is embedded. The light source 331 may be the at least one blue LED. The light radiating surface 332 of the light source 331 may be provided as to be horizontal with respect to an embedding surface 334 of the printed circuit board 333 while facing the incidence surface 41 of the light guide plate 40.

The embedding surface 334 of the printed circuit board 333 may be vertically disposed at a side of the light guide plate 40 with respect to the incidence light emitting surface 42 of the light guide plate 40.

The display module 300 may include a heat sink 335 positioned between the light source module 330 and the bottom chassis 90 for radiating the heat generated from the light source 331 to the bottom chassis 90.

The heat sink 335 may be integrally structured with a board contacting unit 336 contacting a rear surface of the printed circuit board 333, and a bottom chassis contacting unit 337 contacting the bottom chassis 90. The board contacting unit 336 and the bottom chassis contacting unit 337 may be integrally formed. The heat sink 335 may be formed by steel material, such as aluminum material having high heat conductivity, or lead material, such as a graphite sheet.

The heat generated from the light source 331 is transferred to the bottom chassis 90 through the printed circuit board 333 and the heat sink 335, and may be radiated to an outside at the bottom chassis 90.

FIG. 8 is a cross-sectional view of the display module according to a fourth embodiment.

Referring to FIG. 8, a display module 400 according to the fourth embodiment will be described. With respect to the components that are identical to those of the aforementioned embodiments, the descriptions may be omitted.

In contrast to the first embodiment, the middle supporting unit 85 of the middle mold 80 may be extended to be inserted into the space between the liquid crystal panel 20 and the optical sheet 62.

That is, the quantum dot sheet 50 and the optical sheets 61 and 62 are positioned between the middle supporting unit 85 and the light guide plate 40, and the liquid crystal panel 20 only is positioned at a front of the middle supporting unit 85.

The quantum dot sheet 50 and the optical sheets 61 and 62 may be stacked without a gap with respect to each other. A predetermined gap G2 may be formed between the second optical sheet 62 and the liquid crystal panel 20.

Through the above arrangement, an optical characteristic that is different from the first embodiment may be obtained.

Figure 9:
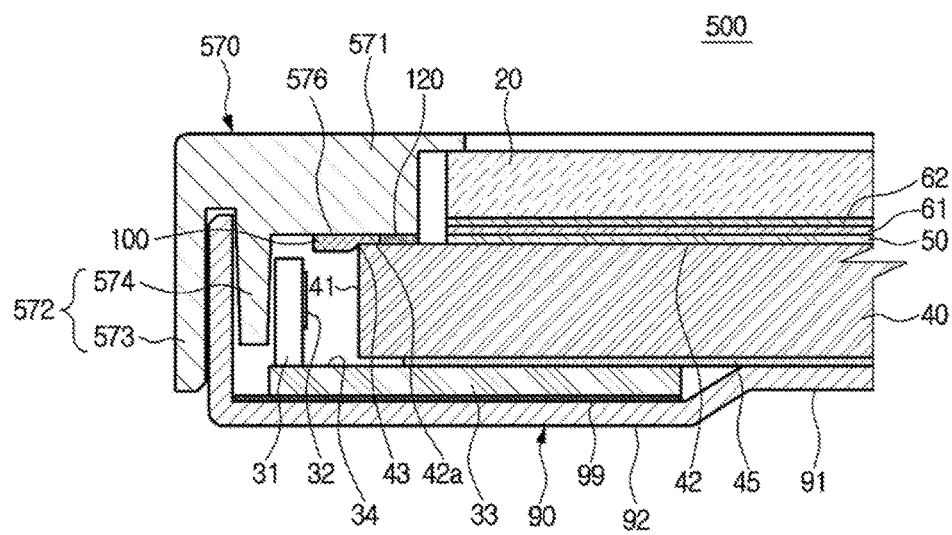
FIG. 9 is a cross-sectional view of the display module according to a fifth embodiment.

FIG. 9 is a cross-sectional view of the display module according to a fifth embodiment.

Referring to FIG. 9, a display module 500 according to the fifth embodiment will be described. With respect to the components that are identical to those of the aforementioned embodiments, the descriptions may be omitted.

The chassis assembly provided to protect and support the liquid crystal panel 20 and the backlight unit may be structured with a top chassis 570 and the bottom chassis 90. That is, the middle mold 80 of the first embodiment may be omitted, or may be integrated with the top chassis 570.

The top chassis 570 may include a bezel unit 571 forming a bezel, and a top side surface unit 572. The top side surface unit 572 may include an outer side coupling unit 573 and an inner side coupling unit 574 configured to be coupled to the bottom chassis 90.

The light guide plate 40, the quantum dot sheet 50, the first optical sheet 61, and the second optical sheet 62 may be stacked and closely attached to each other.

The top chassis 570 may include a light guide plate supporting unit 576 to support the edge unit 42a of the front surface 42 of the light guide plate 40. The light guide plate supporting unit 576 may be formed to have a plane surface to be closely attached to the edge unit 42a of a front surface 42 of the light guide plate 40.

The supplement member 100 may be coupled to the light guide plate 40 and the light guide plate supporting unit 576 to prevent or minimize the light radiated from the light source 31 from exiting through the gap between of the light guide plate 40 and the light guide plate supporting unit 576.

The supplement member 100 may be provided with white color such that the heat generated from the light source 31 may be prevented or minimized from being transferred to the liquid crystal panel 20 because the heat is primarily transferred to the top chassis 570 after being absorbed through the supplement member 100 and the middle mold that are injection-molded mainly by use of black-colored material.

Figure 10:
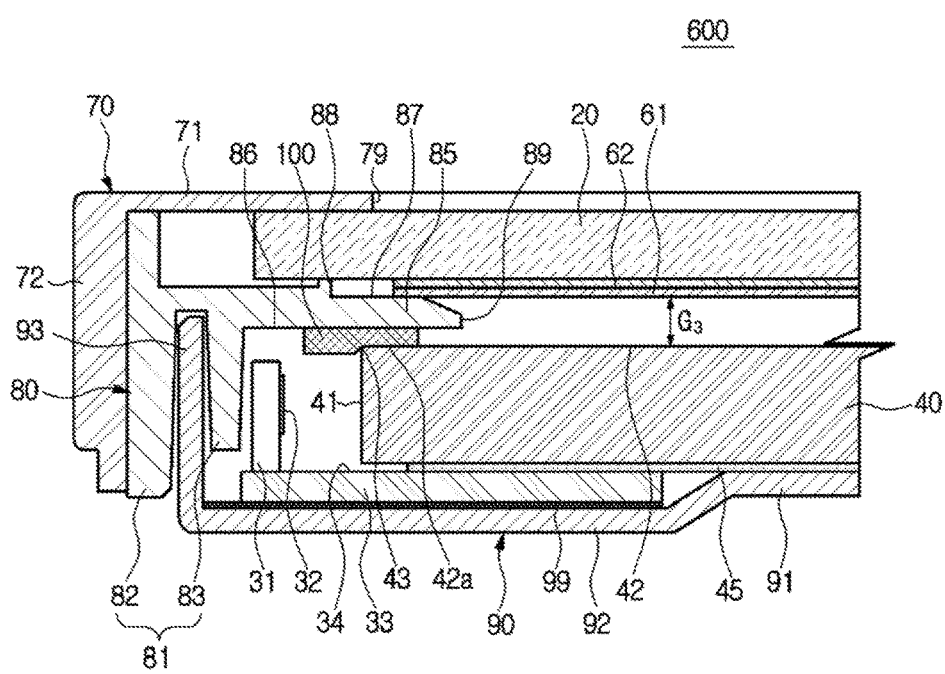
FIG. 10 is a cross-sectional view of the display module according to a sixth embodiment.

FIG. 10 is a cross-sectional view of the display module according to a sixth embodiment.

Referring to FIG. 10, a display module 600 according to the sixth embodiment will be described. With respect to the components that are identical to those of the aforementioned embodiments, the descriptions may be omitted.

The supplement member 100 may be applied to the display module 600 where the quantum dot sheet 50 is omitted. In this way, the bright line may be prevented or minimized and the heat radiation performance may be enhanced.

The middle supporting unit 85 of the middle mold 80 may be inserted into the space between the light guide plate 40 and the optical sheet 61. A predetermined gap G3 may be formed between the light guide plate 40 and the optical sheet 61. The first optical sheet 61, the second optical sheet 62, and the liquid crystal panel 20 may be stacked and closely attached to each other.

The middle supporting unit 85 may include the light guide plate supporting unit 86 to support the edge unit 42a of the front surface 42 of the light guide plate 40. The light guide plate supporting unit 86 may be formed to have a plane surface as to be closely attached to the edge unit 42a of a front surface 42 of the light guide plate 40.

Due to a tolerance of parts, an assembly error, or a deformation of the light guide plate 40, a gap may exist between the light guide plate supporting unit 86 of the middle supporting unit 85 and the edge unit 42a of the front surface 42 of the light guide plate 40. The light exiting through the gap may cause the bright line phenomenon.

The display module 600 may include the supplement member 100 as to prevent or minimize the light radiated from the light source 31 from exiting through the gap between the light guide plate 40 and the middle supporting unit 85.

The supplement member 100 may be provided with white color such that the heat generated from the light source 31 may be prevented or minimized from being transferred to the liquid crystal panel 20 because the heat is primarily transferred to the middle mold 80 after being absorbed through the supplement member 100.

In accordance with the aspect of the present disclosure, the color reproducibility of a display apparatus may be enhanced.

In accordance with the aspect of the present disclosure, the occurrence of a bright line due to a light leakage may be prevented or minimized.

In accordance with the aspect of the present disclosure, the heat radiation of a display apparatus may be enhanced.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus, comprising:
a top chassis;
a bottom chassis;
a liquid crystal panel configured to display images;
a light source disposed at a side of the liquid crystal panel and configured to generate light;
a light guide plate configured to guide the light generated from the light source to the liquid crystal panel;
a quantum dot sheet disposed on a front surface of the light guide plate;
at least one optical sheet disposed to be apart from the quantum dot sheet and face the quantum dot sheet through a gap between the at least one optical sheet and the quantum dot sheet;
a middle mold disposed between the top chassis and the bottom chassis, and comprising an outer frame unit and a middle supporting unit, wherein the middle supporting unit is configured to support a front edge of the light guide plate and extend from the outer frame unit toward the gap between the at least one optical sheet and the quantum dot sheet; and
a supplement member disposed to be in contact with the middle supporting unit, the light guide plate, and the quantum dot sheet, and configured to reflect the light generated from the light source.

2. The display apparatus of claim 1, wherein:
the supplement member comprises an elastic material.

3. The display apparatus of claim 1, wherein:
the supplement member is in contact with the front edge of the light guide plate, and is elastically deformed by a pressure of the light guide plate.

4. The display apparatus of claim 1, wherein:
the supplement member is formed by one of a plurality of materials comprising polyurethane foam, silicon, rubber, and sponge.

5. The display apparatus of claim 1, wherein:
the supplement member comprises a yellowing prevention material to delay a yellowing phenomenon caused by ultraviolet light.

6. The display apparatus of claim 1, wherein:
the supplement member comprises a protective coating layer and the protective coating layer is in contact with the light guide plate.

7. The display apparatus of claim 6, wherein:
the protective coating layer comprises a urethane material.

8. The display apparatus of claim 1, further comprising:
an adhesive member configured to couple the supplement member to the middle supporting unit.

9. The display apparatus of claim 1, further comprising:
a fluorescent member provided separately from the quantum dot sheet and disposed between an opening of the middle supporting unit and the supplement member.

10. The display apparatus of claim 9, wherein:
the fluorescent member is configured to receive a blue light and convert the blue light to a white light.

11. The display apparatus of claim 1, wherein:
the light source comprises at least one blue light emitting diode (LED).

12. The display apparatus of claim 1, further comprising:
a printed circuit board at which the light source is embedded, and
the light source is embedded such that a light radiating surface of the light source is arranged to be vertical to an embedding surface of the printed circuit board, and the embedding surface of the printed circuit board is arranged to be vertical to a light incidence surface of the light guide plate.

13. The display apparatus of claim 1, wherein:
the quantum dot sheet is disposed between the middle supporting unit and the light guide plate, and the at least one optical sheet is disposed between the liquid crystal panel and the middle supporting unit.

14. The display apparatus of claim 1, wherein:
the light source comprises the at least one blue LED, and the at least one blue LED is disposed at each of opposite sides of the light guide plate or is disposed at one of the opposite sides of the light guide plate.

15. The display apparatus of claim 1, further comprising:
a printed circuit board at which the light source is embedded, and
the light source is embedded such that a light radiating surface of the light source is arranged to be horizontal to an embedding surface of the printed circuit board, and the embedding surface of the printed circuit board is arranged to be horizontal to a light incidence surface of the light guide plate.

16. The display apparatus of claim 15, comprising:
a heat sink comprising a board contacting unit and a bottom chassis contacting unit;
wherein the board contacting unit is disposed to contact a rear surface of the printed circuit board and the bottom chassis contacting unit is disposed to contact the bottom chassis such that heat generated from the light source is transferred to the bottom chassis.

17. A display apparatus, comprising:
a bottom chassis;
a liquid crystal panel configured to display images;
a light source disposed at a side of the liquid crystal panel and configured to generate light;
a light guide plate configured to guide the light generated from the light source to the liquid crystal panel;
a quantum dot sheet disposed on a front surface of the light guide plate;
at least one optical sheet disposed to face the quantum dot sheet;
a top chassis comprising a light guide plate supporting unit configured to support a front edge of the light guide plate;
a fluorescent member disposed on the light guide plate and apart from the quantum dot sheet; and
a supplement member disposed to be in contact with the top chassis, the light guide plate supporting unit, and the fluorescent member, and configured to reflect the light generated from the light source.

18. The display apparatus of claim 17, wherein the supplemental member comprises an elastic material.

* * * * *